Patented June 30, 1925.

1,544,224

UNITED STATES PATENT OFFICE.

GEORGE W. DARLINTON, OF SAN PEDRO, CALIFORNIA.

POLISH FOR AUTOMOBILES AND THE LIKE.

No Drawing.　　　Application filed June 19, 1924.　Serial No. 721,011.

*To all whom it may concern:*

Be it known that I, GEORGE W. DARLINTON, a citizen of the United States, residing at San Pedro, in the county of Los Angeles and State of California, have invented new and useful Improvements in Polishes for Automobiles and the like, of which the following is a specification.

My invention relates to a polish for automobiles and the like, and it is an object of this invention to provide a polish which is easily applied and is not sticky during the process of polishing, and which leaves a durable, water, finger and dust proof polish.

My invention consists in the combination of ingredients hereinafter described and claimed.

The following ingredients are used in the composition of my polish, the parts being indicated by volume.

1 part carnauba wax, 3 parts beeswax, 24 parts eucalyptus oil, 24 parts boiled linseed oil, 12 parts Chinese wood oil, to which about 3% of litharge has been added as a dryer, 160 parts water.

The ingredients are combined in the following manner:

The eucalyptus oil is heated to the melting point of wax, and the carnauba and beeswax are added, until they are thoroughly dissolved and the solution is clear. The solution is cooled slowly, and then the linseed oil and Chinese wood oil are added thereto, then the water, and the mixture thoroughly agitated to form a permanent emulsion. The color is white and has the consistency of cream, with a yellowish cast. Light and the contact with air seems to bleach it to a pure white.

Eucalyptus oil, as well known, is an essential oil, but is superior to turpentine in that it will cause the polish on the surface to be treated to dry more quickly and leave a more brilliant and hard surface finish. Eucalyptus oil also bleaches the linseed and Chinese wood oils. The linseed and Chinese wood oils, which are drying oils, cause the polish film to retain its elasticity and prevent its cracking.

It is preferable to add litharge to the Chinese wood oil to cause the same to dry more quickly and to prevent opaqueness of the latter, which would occur if the litharge were omitted.

In place of the beeswax, carnauba wax alone may be used, or vice versa, but the better results are obtained by using carnauba wax and beeswax together, carnauba wax leaving a harder finish than beeswax, the beeswax appears to have the property of filling the holes of the surface to be finished better than carnauba wax.

Chinese wood oil may be omitted, and linseed oil alone may be used, or vice versa, although again, a mixture of the two gives the best results.

The eucalyptus oil, however, is essential, and good results may be obtained by using an emulsion consisting of any drying oil, wax, eucalyptus oil and water.

To the emulsion as prepared, ten drops of eucalyptus oil are added to every ounce. This addition of the eucalyptus oil to the finished emulsion facilitates the application of the polish to the surface to be treated.

Fifteen or twenty drops of the polish are applied to a cheesecloth, and the latter is quickly run over the surface to be polished, and may be rubbed dry with the same cloth, or may be finished with a dry cloth. The polish may be applied to the surface and left thereon from one-half hour to six hours, and then be rubbed dry with the dry cloth, and will leave a brilliant, durable, dust, finger and waterproof finish.

My polish may be used in polishing any hard surfaces, either of metal, enamel, wood, leather and imitation of leather and the like.

The proportions of the ingredients may be varied widely, but best results are obtained by following the same as above indicated.

I claim:

1. A polishing composition in the form of an emulsion, containing eucalyptus oil, a waxy material, a drying oil and water.

2. A polishing composition in the form of an emulsion, containing eucalyptus oil, carnauba wax, a drying oil and water.

3. A polishing composition in the form of an emulsion, containing eucalyptus oil, carnauba wax, beeswax, a drying oil and water.

4. A polishing composition in the form of an emulsion, containing eucalyptus oil, carnauba wax, beeswax, linseed oil and water.

5. A polishing composition in the form of an emulsion, containing eucalyptus oil, carnauba wax, beeswax, linseed oil, Chinese wood oil and water.

6. A polishing composition in the form of an emulsion, consisting of the following ingredients in the proportions specified:

| | Parts. |
|---|---|
| Eucalyptus oil | 24 |
| Linseed oil | 24 |
| Chinese wood oil | 12 |
| Beeswax | 3 |
| Carnauba wax | 1 |
| Water | 160 |

In testimony whereof I have signed my name to this specification.

GEO. W. DARLINTON